(12) United States Patent
Seales

(10) Patent No.: US 9,387,790 B2
(45) Date of Patent: Jul. 12, 2016

(54) UTILITY TERRAIN VEHICLE MOUNTED CRANE

(71) Applicant: Impac Manufacturing, Inc., Los Fresnos, TX (US)

(72) Inventor: Paul Seales, Port Isabel, TX (US)

(73) Assignee: IMPAC Manufacturing, Inc., Los Fresnos, TX (US)

( * ) Notice: Subject to any disclaimer, the term of this patent is extended or adjusted under 35 U.S.C. 154(b) by 105 days.

(21) Appl. No.: 14/250,184

(22) Filed: Apr. 10, 2014

(65) Prior Publication Data

US 2014/0314533 A1 Oct. 23, 2014

Related U.S. Application Data

(60) Provisional application No. 61/813,318, filed on Apr. 18, 2013.

(51) Int. Cl.
*B60P 1/54* (2006.01)

(52) U.S. Cl.
CPC .................................. *B60P 1/5428* (2013.01)

(58) Field of Classification Search
CPC ...... B60P 1/5428; B60P 1/483; B60P 1/6463; B66C 23/44
USPC ......................................................... 414/546
See application file for complete search history.

(56) References Cited

U.S. PATENT DOCUMENTS

| | | | | | |
|---|---|---|---|---|---|
| 2,332,962 | A | * | 10/1943 | Barrett ..................... | B60P 1/483 298/22 R |
| 2,582,111 | A | | 1/1952 | Eakin | |
| 2,639,825 | A | | 5/1953 | Eakin | |
| 3,276,610 | A | * | 10/1966 | Thatcher ............... | B60P 1/5428 212/289 |
| 4,058,229 | A | * | 11/1977 | Triplett ..................... | B60P 1/48 212/256 |
| 4,383,791 | A | * | 5/1983 | King ..................... | B60P 1/5428 414/542 |
| 4,613,274 | A | * | 9/1986 | Stapleton ................ | B60P 1/483 298/22 D |
| 5,431,526 | A | * | 7/1995 | Peterson ............... | B60P 1/5433 212/223 |
| 5,730,304 | A | * | 3/1998 | Duncan ................. | B60P 1/5433 212/180 |
| 6,435,806 | B1 | * | 8/2002 | Rinderknecht ......... | B60P 1/483 212/255 |
| 6,460,908 | B1 | | 10/2002 | Green | |
| 6,799,935 | B1 | * | 10/2004 | Grollitsch ............. | B60P 1/5428 414/467 |
| 7,232,285 | B1 | * | 6/2007 | Ruch ..................... | B60P 1/4421 254/10 R |
| 7,287,948 | B2 | * | 10/2007 | Knoell .................. | B60P 1/5428 212/180 |
| 7,992,732 | B2 | * | 8/2011 | Demiany ................ | B60P 1/483 212/180 |
| 8,221,048 | B2 | * | 7/2012 | Grollitsch ............... | B60P 1/483 414/462 |
| 8,555,592 | B2 | * | 10/2013 | Daudet ................. | E04B 1/2403 52/489.1 |

(Continued)

OTHER PUBLICATIONS

Deere Gator XUV Brochure, Oct. 2006.

*Primary Examiner* — Kaitlin Joergen
(74) *Attorney, Agent, or Firm* — Patterson & Sheridan, LLP

(57) ABSTRACT

A crane includes: a base for being disposed in or on a cargo box of a utility terrain vehicle (UTV) and for fastening to a bed of the cargo box; a boom rotatable relative to the base between a deployed position and a stowed position; a boom hoist operable to swing the boom between the positions; and a load hoist operable to lift cargo located adjacent to a rear end of the UTV when the boom is in the deployed position and operable to carry the cargo toward the UTV as the boom is swung to the stowed position, thereby loading the cargo into the cargo box.

11 Claims, 5 Drawing Sheets

(56) References Cited

U.S. PATENT DOCUMENTS

| | | | |
|---|---|---|---|
| 8,839,968 B2* | 9/2014 | Seales | B60P 1/483 212/255 |
| 2003/0170105 A1* | 9/2003 | Lester | B66C 23/44 414/546 |
| 2006/0133916 A1 | 6/2006 | Wood | |
| 2009/0115238 A1* | 5/2009 | Lane | B60P 1/5428 298/22 C |
| 2011/0168417 A1 | 7/2011 | Benesch | |
| 2011/0215065 A1 | 9/2011 | Seales | |
| 2012/0275890 A1* | 11/2012 | Seales | B66C 23/44 414/542 |
| 2013/0183126 A1* | 7/2013 | Alexander | B60P 1/5428 414/542 |
| 2014/0314533 A1* | 10/2014 | Seales | B60P 1/5428 414/542 |

\* cited by examiner

UTILITY TERRAIN VEHICLE MOUNTED CRANE

BACKGROUND OF THE DISCLOSURE

1. Field of the Disclosure

The present disclosure generally relates to a utility terrain vehicle mounted crane.

2. Description of the Related Art

Utility terrain vehicles (UTVs) are a type of all-terrain vehicles (ATVs) with truck-like features whose use is focused on doing work around a home, garden, ranch, or farm. The use of these vehicles for work not only saves the user time, but also prevents back and muscle injuries due to overexertion. Accessories are available, for example, to mow lawns, aerate lawns, transport materials, and plow snow.

SUMMARY OF THE DISCLOSURE

In one embodiment, a crane includes: a base for being disposed in or on a cargo box of a utility terrain vehicle (UTV) and for fastening to a bed of the cargo box; a boom rotatable relative to the base between a deployed position and a stowed position; a boom hoist operable to swing the boom between the positions; and a load hoist operable to lift cargo located adjacent to a rear end of the UTV when the boom is in the deployed position and operable to carry the cargo toward the UTV as the boom is swung to the stowed position, thereby loading the cargo into the cargo box.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
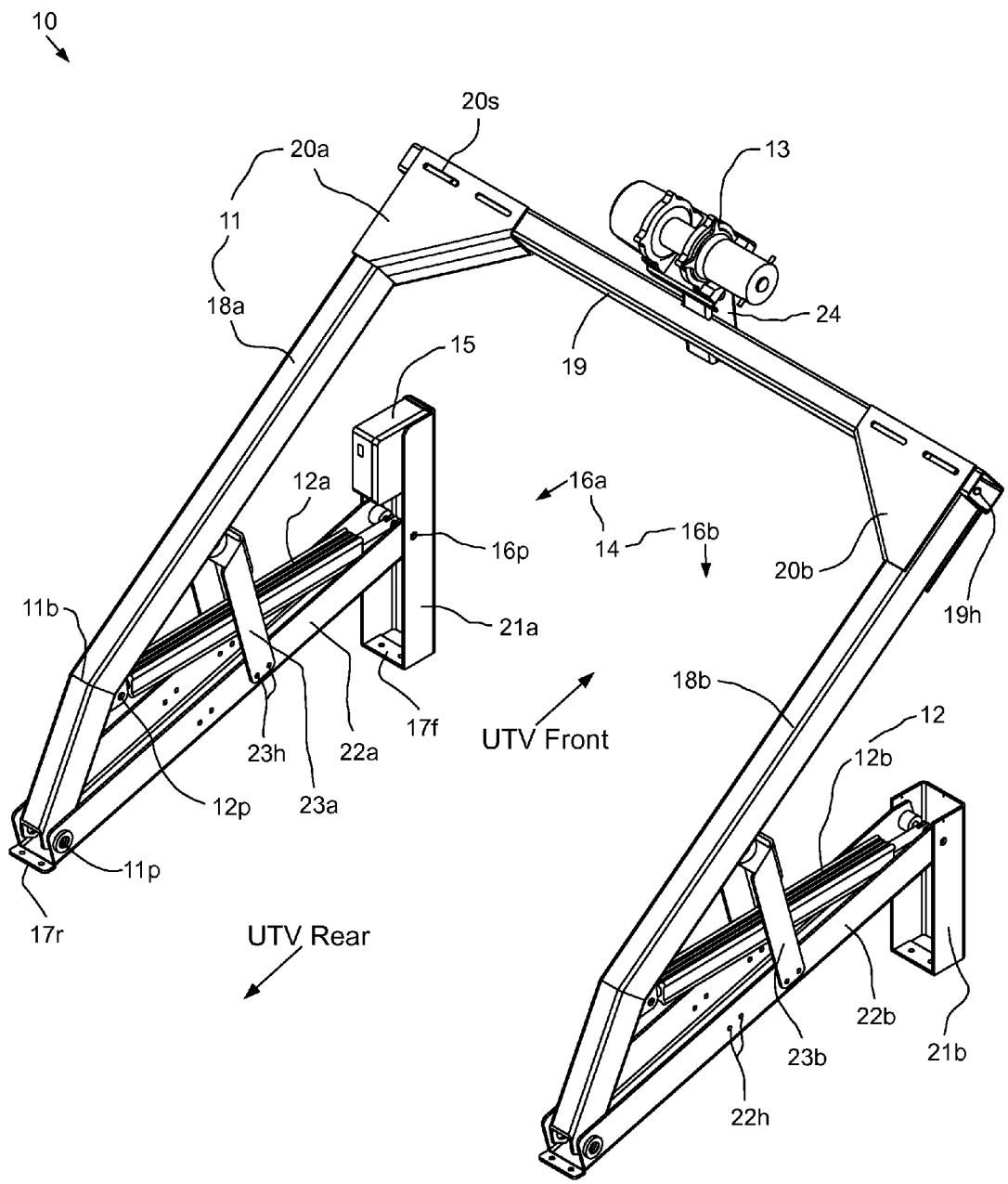
FIG. 1 illustrates a crane for mounting onto a utility terrain vehicle (UTV), according to one embodiment of the present disclosure.
Figure 2A:
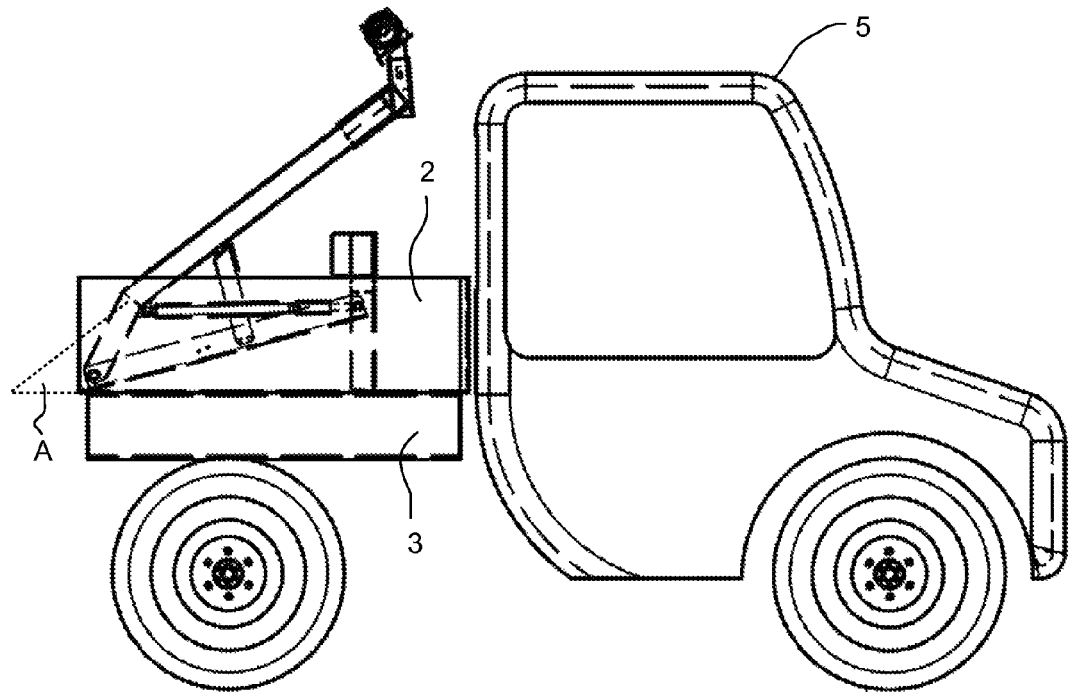
FIGS. 2A and 2B illustrate adjustment of the crane for different length cargo boxes.

FIG. 1 illustrates a crane 10 for mounting onto a utility terrain vehicle (UTV) 1 (FIG. 2A), according to one embodiment of the present disclosure. The UTV 1 may include a cab 5, such as a single, side by side, or crew cab. The cab 5 may or may not have a roof and/or rollover protection structure. The UTV 1 may further include an engine (not shown), such as a gasoline, diesel, hybrid, or natural gas or an electric motor driven entirely by batteries. The front portion of the UTV 1, especially the engine, may serve as a counterweight for the crane 10. The cab 5 may further include a steering wheel, a driver's seat, such as a chair or bench, a gear shifter, a mode shifter, an accelerator pedal, a brake pedal, and other instruments and controls. The UTV 1 may further include a cargo box 2 mounted on a chassis 3 thereof. Alternatively, the UTV may have a flat cargo bed instead of the box. The UTV 1 may further include a transmission, such as a continuously variable transmission, a drive shaft, a front and/or rear differential, and two or more axles. The UTV 1 may further include four or more wheels 4. The UTV 1 may be front, rear, or four wheel drive.

The crane 10 may include a boom 11, a boom hoist 12, a load hoist 13, and a base 14. The crane 10 may have a load capacity corresponding to a cargo capacity of the UTV 1, such as greater than or equal to one-eighth, one-quarter, one-half, or three-quarter ton. The boom 11 may include one or more structural members, such as a pair of beams 18a,b and a crosstie 19. The base 14 may include a frame 16a,b for each beam 18a,b, and a controller 15. Each frame 16a,b may include a respective post 21a,b, a rail 22a,b, and a boom stop 23a,b.

The boom 11 may be made from a high strength metal or alloy, such as steel or aluminum (including alloys thereof). The steel may be plain carbon, low alloy, high strength-low alloy or stainless. The aluminum alloy may be an automotive, cycling, or aerospace alloy. The structural members 18, 19 may be rectangular (i.e., square) tubing or other structural shapes, such as C, L, I, or pipe. Each frame post 21a,b and rail 22a,b may have a channel shape and be made from any of the boom materials. Each stop 23a,b may have a forked shape made from welded plate of any of the boom materials. One of the posts 21a,b may be extended for receiving the controller 15.

Figure 2B:
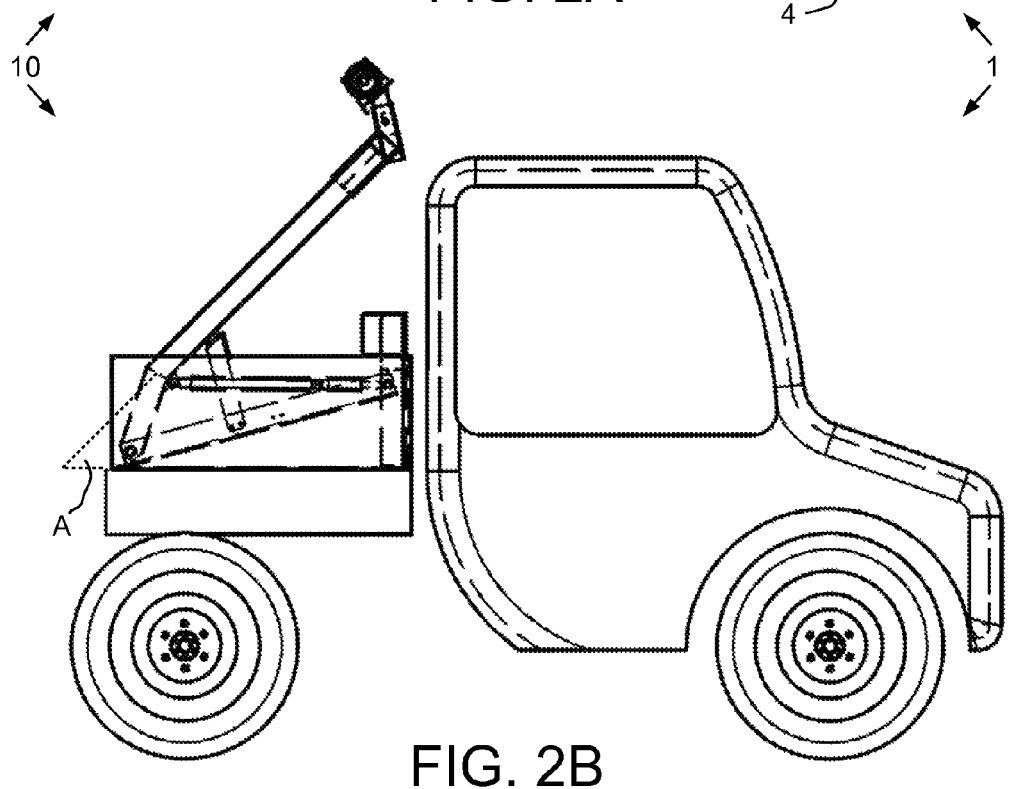
Figure 2C:
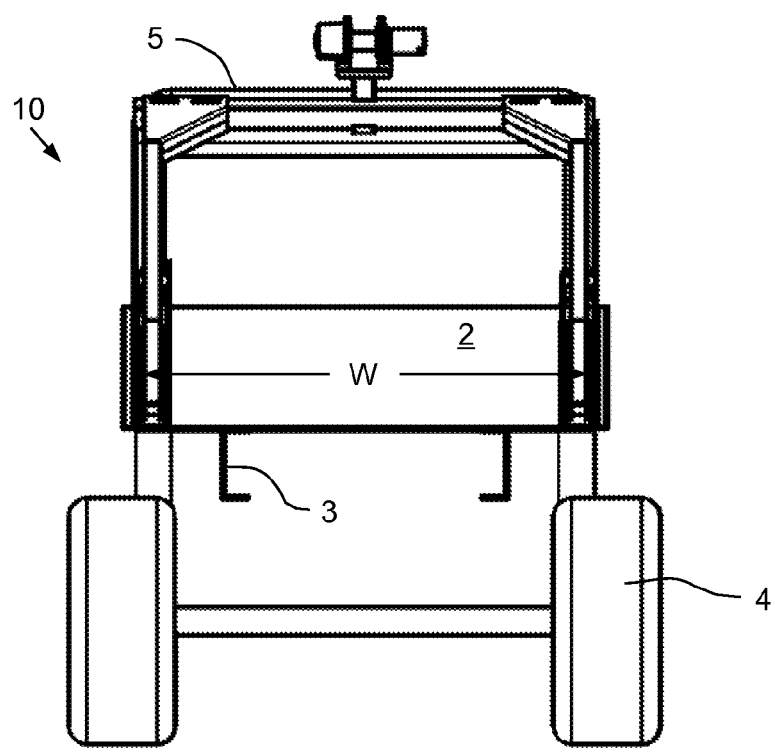
FIGS. 2C and 2D illustrate adjustment of the crane for different width cargo boxes.
Figure 2D:
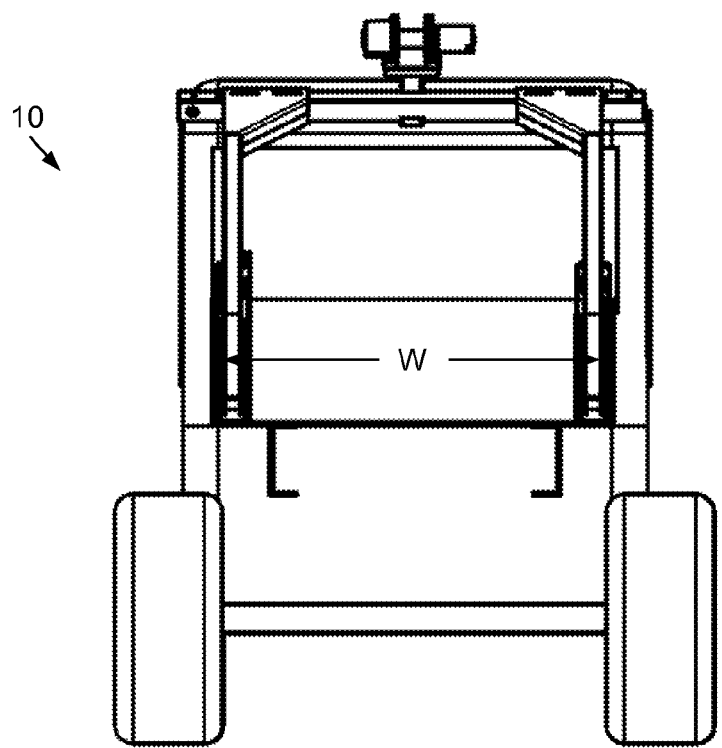

Each beam 18a,b may be pivoted 11p to a respective frame rail 22a,b using fasteners and bearings or bushings. The pivots 11p may be located adjacent to a rear end of the base 14. The boom 11 may further include gussets 20a,b connecting the respective beams 18a,b to the crosstie 19. Each gusset 20a,b may be connected to an end of the respective beam 18a,b, such as by fasteners or weld. Each gusset 20a,b may have a passage formed therethrough for receiving the crosstie 19. The crosstie 19 may have sets of one or more holes 19h formed adjacent each end thereof and spaced therealong and each gusset 20a,b may have one or more slots 20s formed laterally therethrough. A width W (FIGS. 2C and 2D) of the base 14 may be adjusted to suit a particular cargo box 2 by moving each gusset 20a,b along the crosstie 19 and inserting fasteners into aligned holes 19h and slots 20s of the crossties and gussets 20a,b. A length of the crosstie 19 may range from four to six feet and the width W may range from four to six feet. A length of the base 14 may range from three to five feet.

The boom 11 may be rotated about the pivots 11p relative to the base 14 by the boom hoist 12. The boom hoist 12 may include a pair of linear actuators 12a,b for the respective beams 18a,b. Each linear actuator 12a,b may include a rotary electric motor and lead screw or linear electric motor. The motor may be compatible with the UTV's accessory power system. A rear end of each linear actuator 12a,b may be pivoted 12p to the respective beam 18a,b and a front end of each linear actuator may be pivoted 16p to the respective frame post 21a,b. Extension of each linear actuator 12a,b may swing the boom 11 to a deployed position and retraction of each linear actuator may swing the boom to a stowed position. Alternatively, each linear actuator may be a hydraulic piston and cylinder assembly.

Each beam 18a,b may include a bend 11b and the respective actuator pivot 12p may be located at the bend. Each bend 11b may be located adjacent to the boom pivot 11p. Each beam 18a,b may rest on a respective boom stop 23a,b in the stowed position. A bumper may be fastened to each stop 23a,b to cushion landing of the boom 11. Each rail 22a,b may have sets 22h of one or more holes formed laterally therethrough and spaced therealong and the respective stop 23a,b may have a set 23h of one or more holes formed laterally through plates thereof. A location of the stops 23a,b may be adjusted to suit a length of a particular cargo box 2 by moving the stops along the respective rails 22a,b and inserting fasteners into aligned holes thereof. Adjusting the position of the stops 23a,b may adjust a stop angle A (FIGS. 2A and 2B) of the boom 11, thereby adjusting a stopped height of the boom to accommodate positioning of the base 14 into or onto a particular cargo box 2. A front end of each rail 22a,b may also be pivoted 16p to the respective post 21a,b and a width of each linear actuator 12a,b may correspond to, such as being slightly less than, a width of a cavity formed in the respective rail 22a,b.

Alternatively, the boom stops 23a,b may be omitted and the controller 15 relocated such that the linear actuators 12a,b are received into the rail cavities in the stowed position and the boom 11 is horizontal and flush or nearly flush with the sides of the cargo box 2 in the stowed position.

Each frame 16a,b may further have one or more mounts 17f,r for installing the base 14 into the cargo box 2. Front mounts 17f may be formed in lower ends of the posts 21a,b. Rear mounts 17r may be formed in the rear ends of the rails 22a,b adjacent to the pivots 11p. Each mount 17f,r may have one or more holes formed therethrough for alignment with holes formed in a bed of the cargo box 2. The base 14 may be fastened to the cargo box bed by insertion of fasteners into the aligned holes.

Alternatively, extensions (not shown) may connect each mount 17f,r to the cargo box bed to elevate the base 14 to a top of the cargo box sides. In this alternative, the width W may be equal to a width of the cargo box 2, thereby minimizing intrusion of the crane 10 into the cargo box.

Figure 3A:
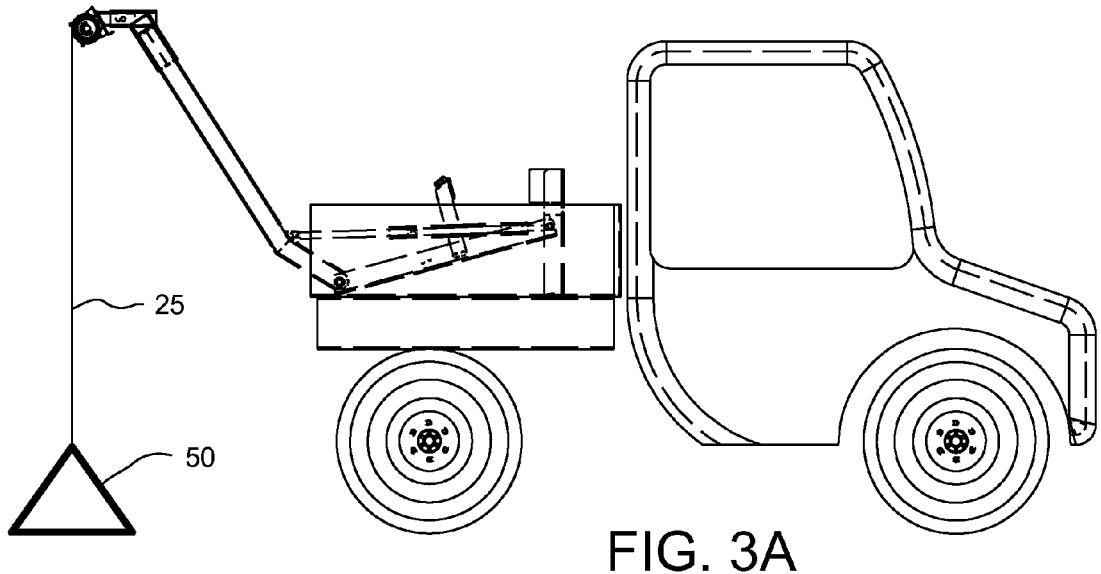
FIGS. 3A-3D illustrate operation of the UTV-mounted crane.
Figure 3B:
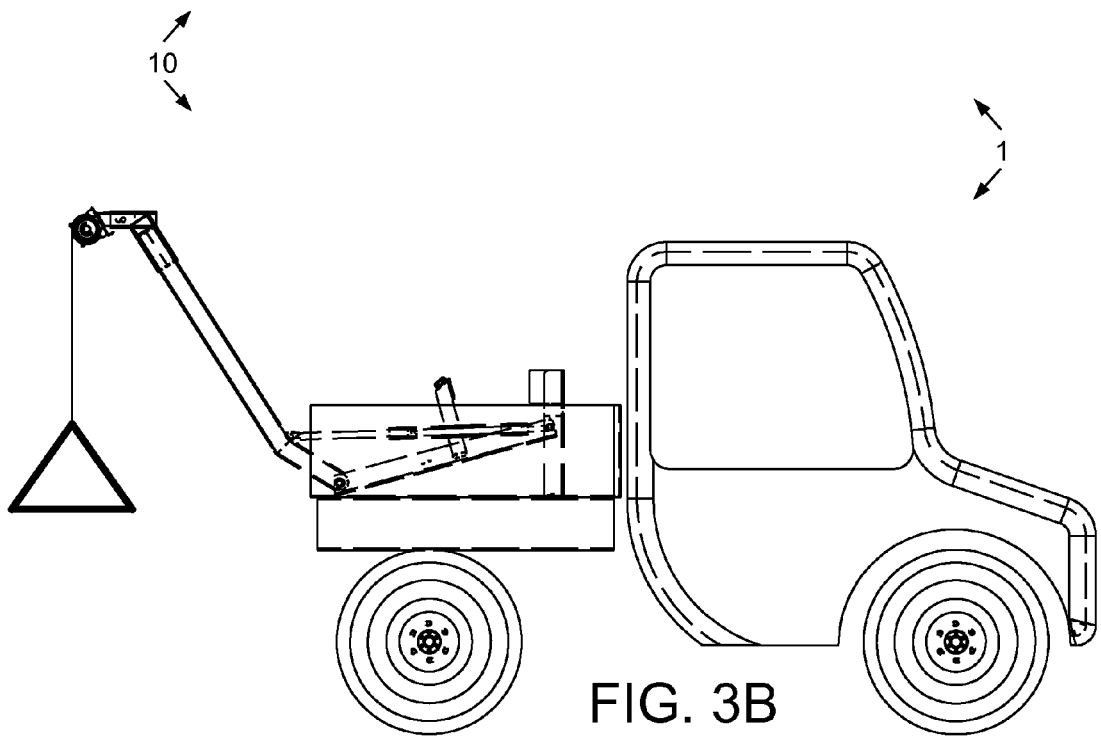
Figure 3C:
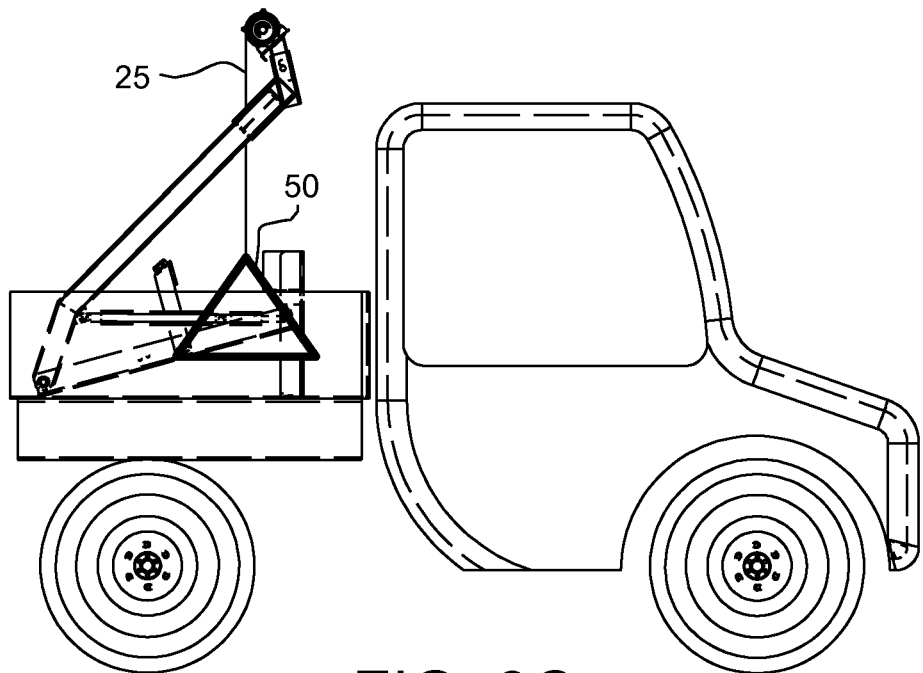
Figure 3D:
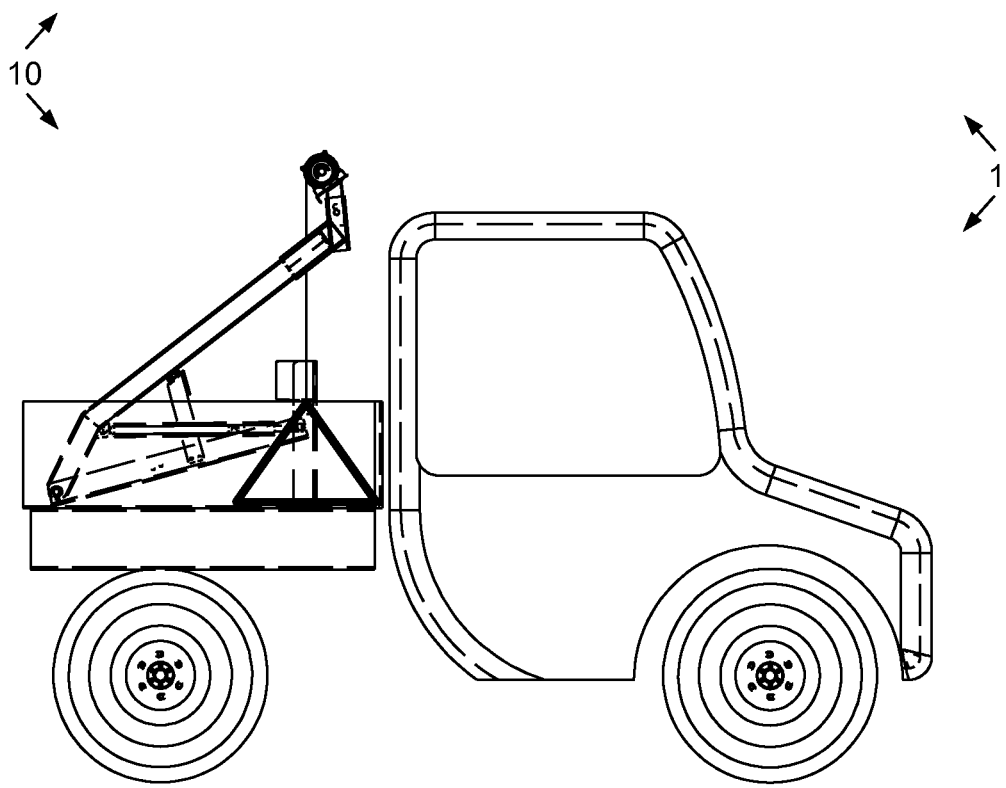

The load hoist 13 may be a winch fastened to the crosstie 19 by a bracket 24. The winch may include a load line 25 (FIG. 3A), such as wire rope, a drum having the wire rope wrapped there-around, a housing, a motor, and a brake. The wire rope may be made from a high strength metal or alloy, such as high strength-low alloy steel, tool steel or spring steel. Alternatively, the wire rope may be made from polyamide or carbon fiber. The motor may be electric and compatible with the UTV's accessory power system. Alternatively, the motor may be hydraulic. A lifting hook (not shown) may be fastened to an eye splice formed in an end of the load line 25.

The crosstie 19 may have another set of one or more holes (not shown) formed laterally therethrough and spaced therealong and the bracket 24 may have a set of one or more holes. A location of the load hoist 13 may be adjusted to suit particular cargo 50 by moving the bracket 24 along the crosstie 19 and inserting fasteners into aligned holes.

The controller 15 may include a driver-operable interface, such as levers or buttons, for selectively operating the hoists 12, 13. The controller 15 may plug into and be compatible with the UTV's accessory power system. The controller 15 may be located at a front end of the base 14 so that the driver may stand clear of the cargo 50 as it is being hoisted and loaded. Wires (not shown) may be routed through the rail 22a and the boom 11 to provide electrical communication between the controller 15 and the hoists 12, 13. Additionally, the crane 10 may further include a floodlight (not shown) fastened to the crosstie 19 and in electrical communication with the controller 15.

FIGS. 3A-3D illustrate operation of the UTV-mounted crane 10. The cargo 50 may include one or more items, such as hay bails, animal carcasses, or crates. Once the driver has backed the UTV 1 into proximity of the cargo 50, the driver may park the UTV 1. The driver may then exit the UTV 1 and access the controller 15. The driver may then swing the boom 11 to the deployed position by operating the boom hoist 12. Deployment of the boom 11 may place the load hoist 13 at a position to lift the cargo 50 located adjacent to a rear end of the UTV 1. The driver may then operate the load hoist 13 to lower the load line 25 to the cargo 50. The driver may then fasten the load line 25 to the cargo 50. The driver may then operate the load hoist 13 to lift the cargo 50 such that a bottom of the cargo is aligned with the chassis 3 or cargo box bed.

The driver may then operate the boom hoist 12 to swing the boom 11 to the stowed position. As the boom 11 rotates about the pivots 11p toward the stowed position, the load hoist 13 may carry the cargo 50 forward along an arcuate path toward the cab 5 until the cargo rests on the cargo box bed and the boom 11 seats onto the stops 23a,b, thereby also loading the cargo onto the UTV 1. The load hoist 13 need not be operated during swinging of the boom 11 to the stowed position (note that the payed out length of load line 25 constant in FIGS. 3B-3D). The load hoist 13 may rest at a position adjacent to a rear end of the cab 5 in the stowed position. Once in the stowed position, the driver may secure the cargo 50 to the cargo box 2. The load line 25 may be left connected to the cargo 50 and serve as a back-up should the cargo break-free of tie-downs. The driver may enter the UTV 1 and transport the cargo 50. Once reaching the destination, the driver may unload the cargo by reversing operation of the crane 10.

Alternatively, the crane may be used with a compact or half-ton pickup truck instead of the UTV 1.

While the foregoing is directed to embodiments of the present disclosure, other and further embodiments of the disclosure may be devised without departing from the basic scope thereof, and the scope of the invention is determined by the claims that follow.

The invention claimed is:

1. A crane, comprising:
   a base for being disposed in or on a cargo box of a utility terrain vehicle (UTV) and for fastening to a bed of the cargo box;
   a boom rotatable relative to the base between a deployed position and a stowed position;
   a boom hoist operable to swing the boom between the positions;
   a load hoist operable to lift cargo located adjacent to a rear end of the UTV when the boom is in the deployed position and operable to carry the cargo toward the UTV as the boom is swung to the stowed position, thereby loading the cargo into the cargo box; and
   wherein the base comprises:
      a pair of rails; and
      a pair of boom stops to cushion landing of the boom and fastened to the respective rails at a plurality of selectable locations for adjustment of the stowed position.

2. The crane of claim 1, wherein the crane is configured to load the cargo without having to further operate the load hoist.

3. The crane of claim 1, wherein the load hoist is an electric winch and the boom hoist comprises a pair of electric linear actuators.

4. The crane of claim 1, wherein:
   the boom is pivotally connected to the base,
   the boom comprises a pair of beams and a crosstie connecting the beams at an end distal from the base, and
   the load hoist is fastened to the crosstie.

5. The crane of claim 4, wherein:
   the boom further comprises a gusset connecting each beam to the crosstie, and
   the gussets and crosstie are connected by a fastener and slot arrangement for adjustment of a width of the base.

6. The crane of claim 4, wherein:
each beam has a bend therein,
the boom hoist comprises a pair of linear actuators,
each linear actuator is pivotally connected to a respective beam at the bend.

7. The crane of claim 6, wherein:
each beam is pivotally connected to the base, and
each bend is located adjacent to the respective beam pivot.

8. The crane of claim 4, wherein:
the base comprises a pair of rails and a pair of posts,
each rail has a cavity therein,
the boom hoist comprises a pair of linear actuators, each having a width corresponding to a width of the cavities, and
each rail and a respective linear actuator are pivotally connected to a respective post at the same location.

9. The crane of claim 8, wherein:
each rail is pivotally connected to a respective beam at an end distal from the actuator pivot,
each rail has a mount for fastening to the cargo bed located adjacent to the respective beam pivot, and
each post has a mount for fastening to the cargo bed.

10. A utility terrain vehicle (UTV), comprising:
at least one of an engine and electric drive motor;
four or more wheels, at least one wheel linked to the engine and/or drive motor;
a cab, comprising:
 a steering wheel;
 an accelerator pedal;
 a brake pedal; and
 a gear shifter;
a chassis;
a cargo box mounted on the chassis; and
the crane of claim 1.

11. The UTV of claim 10, further comprising a continuously variable transmission linking the wheel to the engine and/or drive motor.

* * * * *